Jan. 24, 1928.

C. A. B. HALVORSON, JR 1,657,256

LIGHT PROJECTOR

Filed April 7, 1924

2 Sheets-Sheet 1

Inventor
Cromwell A. B. Halvorson Jr.,
by
His Attorney.

Jan. 24, 1928. 1,657,256
C. A. B. HALVORSON, JR
LIGHT PROJECTOR
Filed April 7. 1924 2 Sheets-Sheet 2
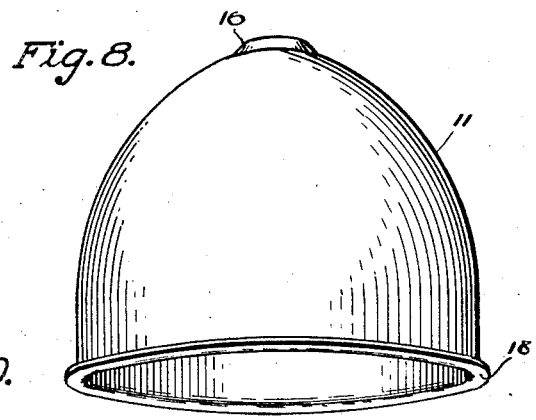
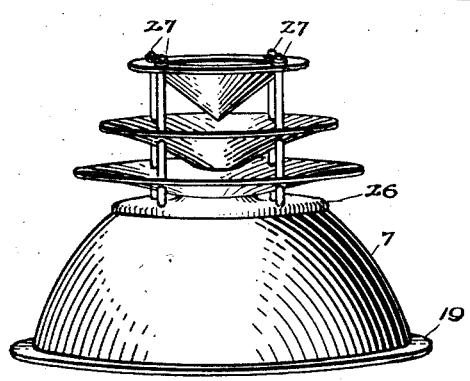
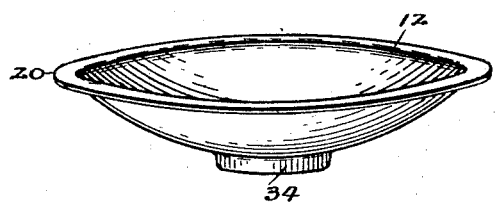
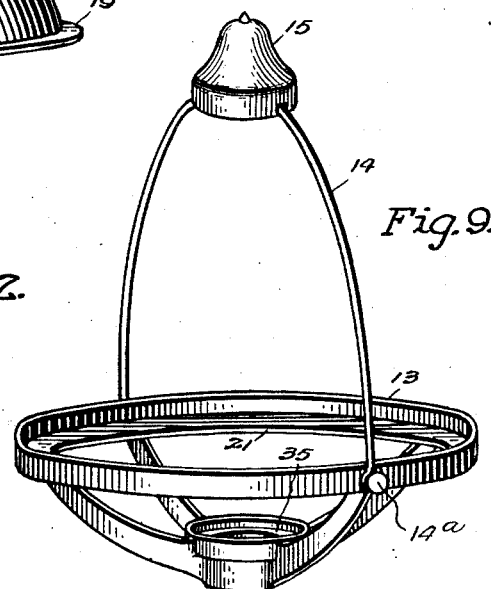
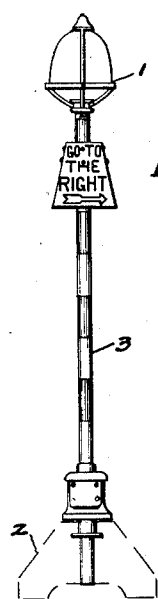
Inventor,
Cromwell A. B. Halvorson, Jr,
by
His Attorney.

Patented Jan. 24, 1928.

1,657,256

UNITED STATES PATENT OFFICE.

CROMWELL A. B. HALVORSON, JR., OF LYNN, MASSACHUSETTS, ASSIGNOR TO GENERAL ELECTRIC COMPANY, A CORPORATION OF NEW YORK.

LIGHT PROJECTOR.

Application filed April 7, 1924. Serial No. 704,726.

My invention relates to light projectors in general, but more in particular my invention relates to that type of projectors which is adapted for directing traffic.

Among the objects of my invention are the following: to provide a novel and effective signaling device of simple construction, convenient in the matter of accessibility of the parts and in the matter of adjustment.

The means for accomplishing the foregoing and other useful ends are hereinafter more fully set forth and claimed, reference being had to the accompanying drawing.

Figure 1:
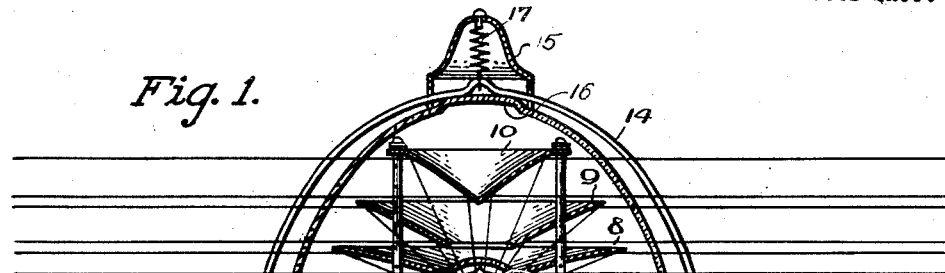
Figure 4:
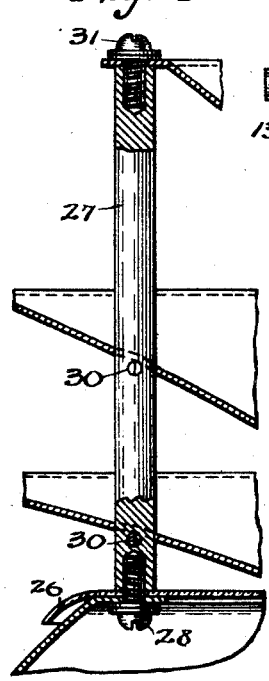
Figure 5:
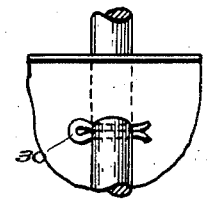
Figure 6:
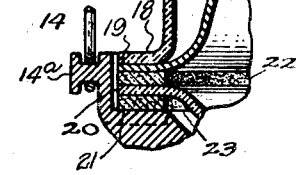
Figure 2:
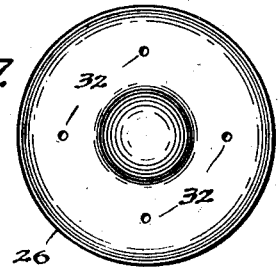
Figure 7:
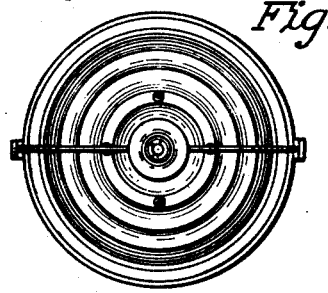
Figure 3:
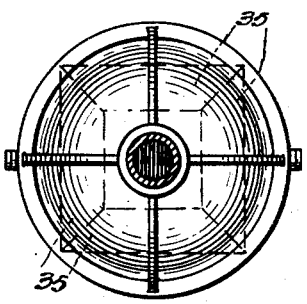

In the drawings Fig. 1 shows the device in elevation. This figure is shown partly in section, the upright being shown broken off above the base; Fig. 2 is a plan view of the device; Fig. 3 is a plan view of the device with the reflectors removed; Fig. 4 is an enlarged detailed view showing how the cone reflector elements are mounted and supported; Fig. 5 is an enlarged view of one of the details of Fig. 4 showing one of the supporting pins for one of the reflector elements; Fig. 6 is an enlarged detailed drawing showing how the reflector elements and the enclosing glass globe are assembled in the supporting frame; Fig. 7 is a plan view of the color cap which is interposed between the light source and the cone reflector elements for affecting the color of the beam reflected from the cones; Fig. 8 is a perspective view of the upper glass dome; Fig. 9 is a perspective view of the frame in which the reflector and the enclosing elements are secured; Fig. 10 shows the assembled reflector in perspective; Fig. 11 shows the lower glass bowl which serves to close the lower portion of the dome in Fig. 8; Fig. 12 is a general drawing of one form of the complete device.

Referring more in detail to the drawings, the device is provided with a base 2, Fig. 12, of any suitable construction to which the upright 3 is secured in any suitable manner. The upright may be hollow as indicated in Fig. 1 in order that the necessary electrical connections may be extended through the upright to the electric lamp 4. As shown in Fig. 1 the upper end of the upright 3 is threaded. Furthermore, the upright is provided with a cap 5 which is shown in threaded engagement with the upright. On top of this cap there is provided a socket 6 for the lamp 4. About the lamp there are located the reflector elements or surfaces 7, 8, 9 and 10. These reflectors are located within a glass enclosure which consists of a dome 11, Fig. 8, of transparent glass, and a base or bowl 12, Fig. 11. The reflectors and enclosing glass elements 11 and 12 are mounted as a whole within the supporting frame 13, Fig. 9. This frame is provided with a curved member 14 which is hinged to the projections 14ª and which serves as a latch to hold the reflector and glass elements in place as indicated in Fig. 1. The latch 14 is provided at the top with a cap 15 which fits on a knoblike protuberance 16 over which it is held in place by the spring 17. By such means the flanges 18, 19 and 20 of the globes 11 and 12 and of the reflector 7 are pressed together as more clearly shown in Fig. 6. Between the flanges 19 and 20 and also between the flanges 20 and 21 of the frame 13 I provide suitable washers 22 and 23 of any suitable resilient material such as leather, rubber, felt, or the like. It will be seen that the frame 13 is provided at its lower central portion, Figs. 1 and 9, with a nut 24. This nut is screwed on the upper end of the upright 3. Below the nut 24 I provide a lock nut 25. The object in this construction is to enable the reflector to be adjusted with respect to the light source 4 by rotating the frame 13.

Referring in detail to the reflectors, the element 7 is a reflector in the form of a paraboloid. As shown in Fig. 1 the axis of this element coincides with the axis of the support 3. The lamp as shown is so mounted on the concave side of the element 7. Obviously by raising and lowering the nut 24 the focal point of the reflecting element 7 can be moved along the axis of the device and adjusted with respect to the light source 4. Therefore, if the focal point of the reflector is not in proper relation to the light source the point may be moved until it is. For example, in order that the reflector may project a beam substantially parallel to the axis of the element 7 the focal point of the reflector must be brought as nearly as possible to coincide with the central point of the filament of the lamp 4, and, with the arrangement shown, this can very readily be accomplished by raising and lowering the frame 13.

As indicated in various figures of the drawing, the reflector 7 is truncated; that is, the vertex region of the surface is cut off and an opening thus provided about the axis through which the rays of light may pass beyond the element 7. The open vertex region therefore subtends a solid conic angle, the apex of which stands at the focal point of the element 7. Beyond this open vertex there is located the second reflecting element 8 which is in the form of a paraboloidal cone the axis of which coincides with the axis of the reflecting surface 7. This cone is also truncated and the vertex region is likewise open and subtends a solid conic angle the apex of which coincides with the focal point of the element 7. The reflecting elements 7 and 8 are so mounted with respect to each other that their focal points coincide. The same may be said of all the reflecting elements 7, 8, 9 and 10.

The reflecting element 9 is also in the form of a paraboloidal truncated cone with an open region about the vertex subtending a solid angle, the apex of which coincides with the focal point of the element 7. The reflecting element 10 is likewise in the form of a paraboloidal conic surface but is not truncated.

It will be seen therefore that the reflecting element 8 subtends a portion of the solid conic angle subtended by the open region in the element 7. Similarly the element 9 subtends a portion of the same solid angle and a portion of the solid angle subtended by the open region of the element 8. Likewise, the reflecting element 10 covers a portion of the solid angle subtended by the open region of the reflector elements 7 or 8 and covers the whole solid angle subtended by the open apex region of the reflecting surface 9.

With the arrangement described and assuming the light source to be located at the common focal point a parallel beam of light will be sent downward toward the base of the upright 3 as indicated in Fig. 1. Furthermore, each of the reflecting elements 8, 9 and 10 will reflect a beam of light, all three of which beams will be parallel and at right angles to the beam from the reflecting element 7 as indicated. With this arrangement the base of the device will be illuminated by the beam from the element 7 and will be visible from all sides. Likewise, the beams from the three elements 8, 9 and 10 will also be visible about a complete circle. The reflecting elements 8, 9 and 10 are so related that when viewed from a distance the beams substantially merge into one another while the intensity of the beam diminishes upward from surface to surface. The result is that from a distance the light reflected from the upper three surfaces has an appearance suggestive of a flame.

In a device of this character it is sometimes necessary that the light reflected by the upper surfaces be of one color and sometimes that it be of another. Therefore, I have interposed between the reflectors 7 and 8 a color cap 26. This cap may be of any properly colored transparent material but I find it preferable to use a flexible material such as celluloid or any other material from which motion picture films are made.

With the device as shown the reflecting elements 8, 9 and 10 and also the color cap 26 are mounted upon the reflecting surface 7 and are secured to it by means of the stems 27 (see Figs. 4 and 10). These stems are clamped in place by screws 28. The color cap 26 is shown clamped between the stems 27 and the reflecting element 7 while the elements 8 and 9 are shown resting on cotter pins 30 (see Figs. 4 and 5). The upper cone 10 is clamped to the upper ends of the stems 27 by means of screws 31. Therefore, the reflector, consisting of the elements 7, 8, 9 and 10, is assembled as a unit, the element 7 serving as a support for the elements 8, 9 and 10 and for the color cap 26. In Fig. 7 perforations 32 in the color cap 26 are shown through which the screws 28 pass.

In order that the bowl 12 may be slipped over the lamp and over the end of the upright 3 it is provided with an opening 33 about which the flange 34 extends which flange is designed to fit into the cup 35 at the bottom of the holder 13.

Secured to the upright 3 and some distance below the reflectors a sign or a series of signs 35 may be located as indicated in Figs. 1 and 3. These signs may be inclined toward the upright at an angle as indicated in order that the rays from the reflecting element 7 may effectively illuminate the writing.

With reference to the surfaces of the conic reflector 8, 9 and 10 it will be understood that these surfaces are formed by revolving a conic curve about its parameter which is the same as revolving the curve about a line through the focal point at right angles to the axis.

In order to comply with the law I have illustrated and described my invention in connection with a specific device. However, in view of the disclosure obviously modifications will readily suggest themselves to others without departing from the spirit of the invention or from the scope of the claims herein.

What I claim as new and desire to secure by Letters Patent of the United States, is:

1. In a projector, a reflector having a plurality of elements each in the form of a surface of revolution, one of said surfaces being obtained by revolving a conic curve about its axis and one being obtained by revolving a conic curve about its parameter, said elements so located with respect to each other that their focal points coincide and their axes of revolution coincide, a source of light at the focal point, and an opening in the vertex region of one of said elements through which opening a bundle of rays from the light source may reach an other of said surfaces whereby a beam may be projected by one element in one direction and another beam may be projected by the other element in a transverse direction.

2. In a projector, a reflector having a series of reflecting elements each in the form of a surface of revolution, one of said surfaces being obtained by revolving a conic curve about its axis and each of the others being obtained by revolving a conic curve about its parameter, said elements so located with respect to each other that their focal points coincide and their axes of revolution coincide, a source of light at the focal point, and an opening in the vertex region of one of the elements through which a bundle of rays from the light source may reach a second one of the elements, and an opening in the vertex region of the second element through which a bundle of rays from the light source may reach a third element whereby a beam of light may be reflected by one of the elements in one direction and a beam of light may be reflected by the other elements in a transverse direction.

3. In a projector, a reflector having a plurality of reflecting elements each in the form of a surface of revolution, one of said surfaces being obtained by revolving a conic curve about its axis and one being obtained by revolving a conic curve about a parameter, said elements so located with respect to each other that their focal points coincide and their axes of revolution coincide, a source of light at the focal point, and an opening in the vertex region of one of said elements through which opening a bundle of rays from the light source may reach the other surface whereby a beam may be projected by one element in one direction and another beam may be projected by the other element in a transverse direction, said elements assembled to form a unit, and rotatable means for supporting said unit in an adjustable relation to the light source, whereby the focal point of the reflector may be moved with respect to the light source.

4. In a projector, a reflector having two reflecting elements each in the form of a surface of revolution, one of said surfaces being obtained by revolving a conic curve about its axis and the other being obtained by revolving a conic curve about a parameter, said elements so located with respect to each other that their focal points coincide and their axes of revolution coincide, a source of light at the focal point, and an opening in the vertex region of one of said elements through which opening a bundle of rays from the light source may reach the other surface whereby a beam may be projected by one element in one direction and another beam may be projected by the other element in a transverse direction, and a color screen interposed between two of the elements and between the light source and one of the elements whereby beams of two different colors may be projected by the reflector.

5. In a projector, a reflector having a plurality of reflecting elements each in the form of a surface of revolution, one of said surfaces being obtained by revolving a conic curve about its axis and one being obtained by revolving a conic curve about its parameter, said elements so located with respect to each other that their focal points coincide and their axes of revolution coincide, one of said elements serving as a support for the other.

6. In a projector, a reflector having a series of reflecting elements each in the form of a surface of revolution, one of said surfaces being obtained by revolving a conic curve about its axis and each of the others being obtained by revolving a conic curve about its parameter, said elements so located with respect to each other that their focal points coincide and their axes of rotation coincide, the elements being thus supported by means of stems attached to the supporting element which stems hold the elements in spaced relation to each other.

7. In a projector, a light source, a support and a reflector for the source, said reflector comprising a plurality of reflecting elements each in the form of a surface of revolution, one of said surfaces being obtained by revolving a conic curve about its axis and one being obtained by revolving a conic curve about its latus rectum, said elements so located with respect to each other that their focal points coincide and their axes of rotation coincide, a source of light at the focal point, and an opening in the vertex region of one of said elements through which opening a bundle of rays from the light source may reach the other surface whereby a beam may be projected by one element in one direction and another beam may be projected by the other element in a transverse direction, said reflector being rotatably and independently mounted on a screw whereby the relation between the light source may be adjusted by rotating the reflector and thereby moving the focal point along the axis of the screw.

8. In a projector, a reflector having a plurality of reflecting elements each in the form of a surface of revolution, one of said surfaces being obtained by revolving a conic curve about its axis and one being obtained by revolving a conic curve about a parameter, said elements so located with respect to each other that their focal points coincide and their axes of revolution coincide, a source of light at the focal point and an opening in the vertex region of one of said elements through which opening a bundle of rays from the light source may reach the other surface whereby a beam may be projected by one element in one direction and another beam may be projected by the other element in a transverse direction.

9. In a projector, a reflector having a series of reflecting elements each in the form of a surface of revolution, one form obtained by revolving a conic curve about its axis and each of the other forms obtained by revolving a curve about a parameter, said elements so located with respect to each other that their focal points coincide and their axes of revolution coincide, a source of light at the focal point, and an opening in the vertex region of one of the elements through which a bundle of rays from the light source may reach a second one of the elements and an opening in the vertex region of the second element through which a bundle of rays from the light source may reach a third element whereby a beam of light may be reflected by one of the elements in one direction and a beam of light may be reflected by the other elements in a transverse direction, said elements assembled to form a unit, and rotating means for supporting said unit whereby the focal point of the reflector may be moved with respect to the light source.

10. A projector comprising a reflecting surface in the form of a truncated paraboloid having an open vertex region about the axis, said open region subtending a solid angle, the apex of the angle being located at the focal point of the reflecting surface, and a light source located within the reflecting surface, a support for the reflector and a support for the light source, adjusting threaded means on said support for adjusting the relation between the reflector and the light source by moving the reflector.

11. A reflecting device comprising a truncated paraboloidal reflector, a series of other reflectors disposed behind and along the axis of the first reflector and spaced from each other, all of said reflectors having a common focal point, all of the reflectors behind the paraboloidal reflector except the last one in the series being truncated and having an opening, the opening in the paraboloidal reflector being the largest in the series and the opening in each succeeding truncated reflector being smaller than the one preceding whereby a source of light located at the focal point will send rays which will strike all of the reflectors whereby the said source may produce two beams of light from the paraboloidal reflector along the axis of the unit and another from the reflectors behind the parabola in a direction transverse the axis of the unit.

12. A reflecting device comprising a truncated paraboloidal reflector, a series of other reflectors disposed behind and along the axis of the first reflector and spaced from each other, all of said reflectors having a common focal point, all of the reflectors behind the paraboloidal reflector except the last one in the series being truncated and having an opening, the opening in the paraboloidal reflector being the largest in the series and the opening in each succeeding truncated reflector being smaller than the one preceding whereby a source of light located at the focal point will send rays which will strike all of the reflectors whereby the said source may produce two beams of light from the paraboloidal reflector along the axis of the unit and another from the reflectors behind the parabola in a direction transverse the axis of the unit, and means for securing said reflectors together to form a unit, a support for said unit and a support for the light source, and means upon said support for adjusting the unit with respect to the light source and for adjusting the light source with respect to the unit.

In witness whereof, I have hereunto set my hand this 4th day of April 1924.

CROMWELL A. B. HALVORSON, Jr.